(No Model.) 4 Sheets—Sheet 1.
A. JOHNSON.
SIDE SEAM CAN SOLDERING MACHINE.
No. 598,518. Patented Feb. 8, 1898.
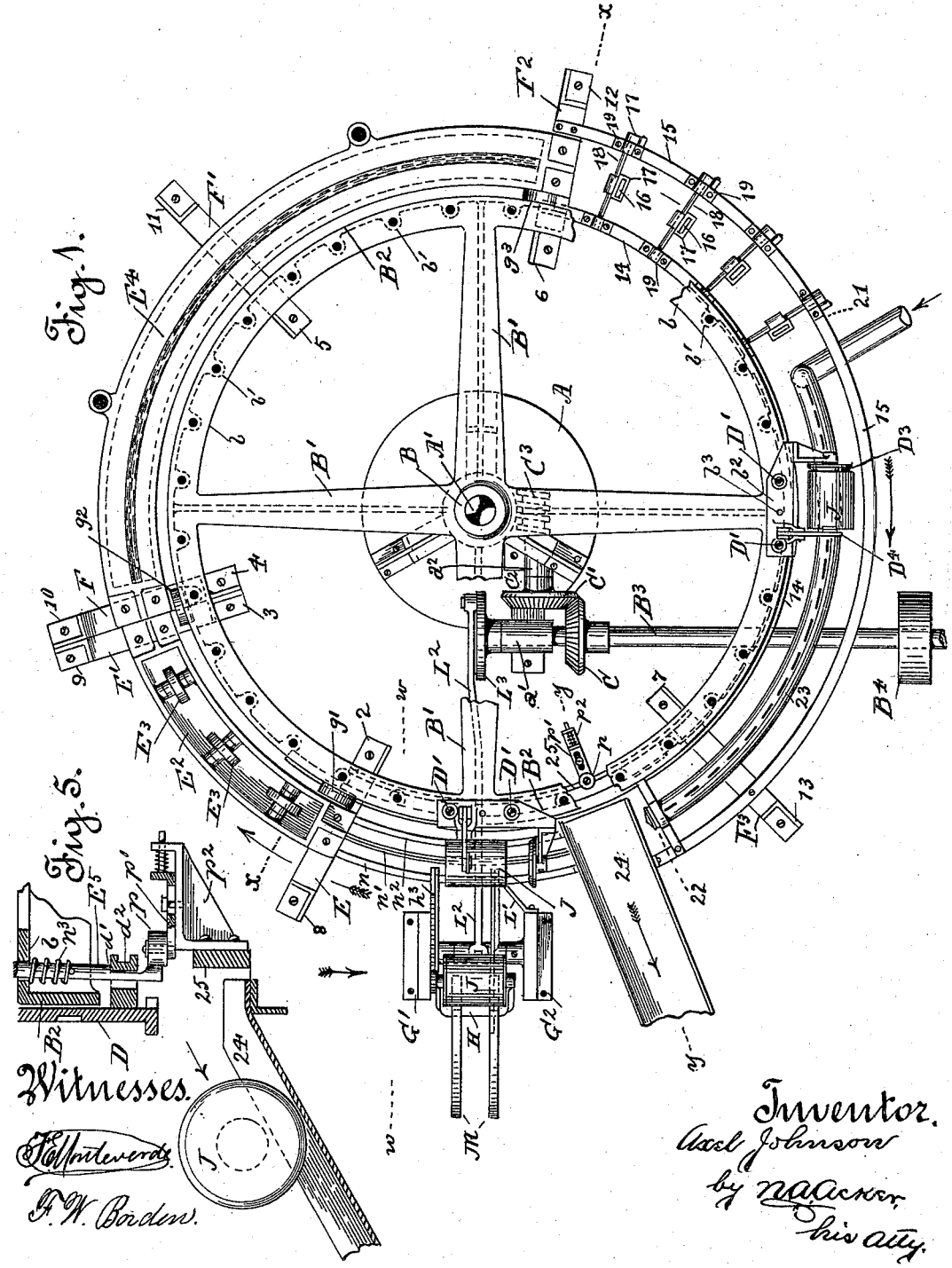
Witnesses.
Inventor.
Axel Johnson
by N. A. Acker,
his atty.

(No Model.) 4 Sheets—Sheet 2.
A. JOHNSON.
SIDE SEAM CAN SOLDERING MACHINE.
No. 598,518. Patented Feb. 8, 1898.
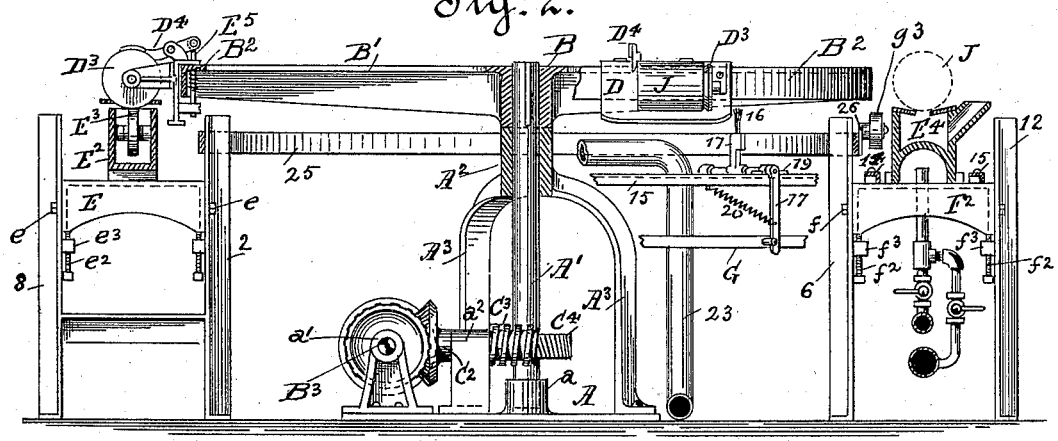
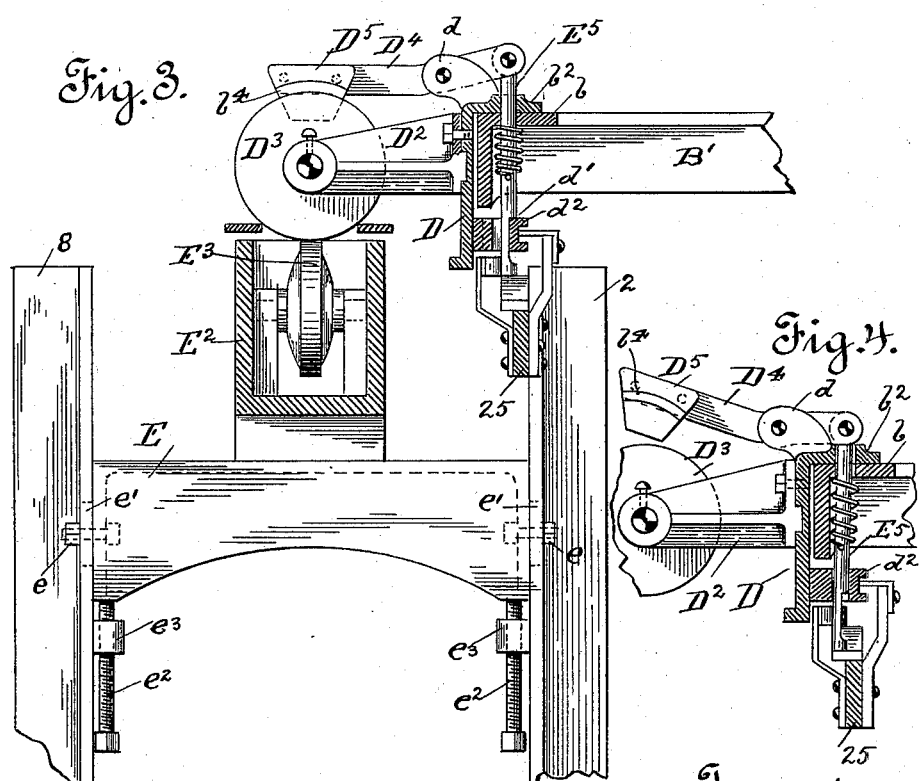

(No Model.) 4 Sheets—Sheet 3.
A. JOHNSON.
SIDE SEAM CAN SOLDERING MACHINE.
No. 598,518. Patented Feb. 8, 1898.
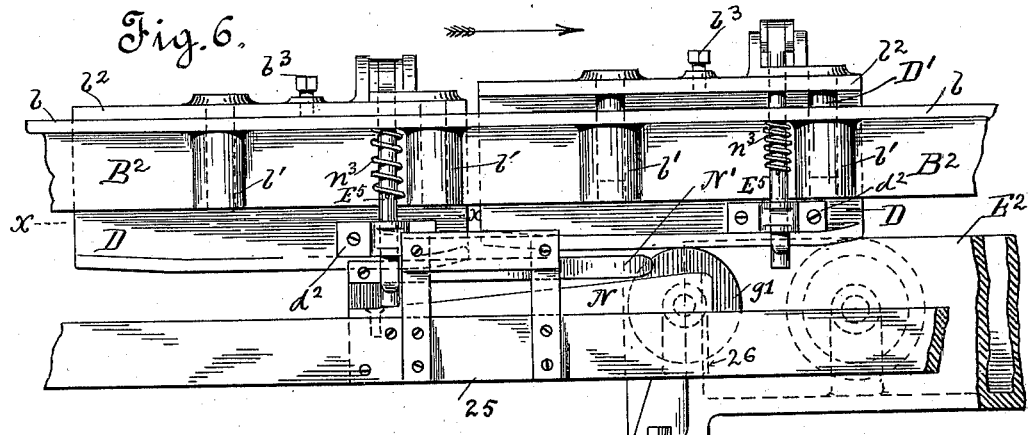
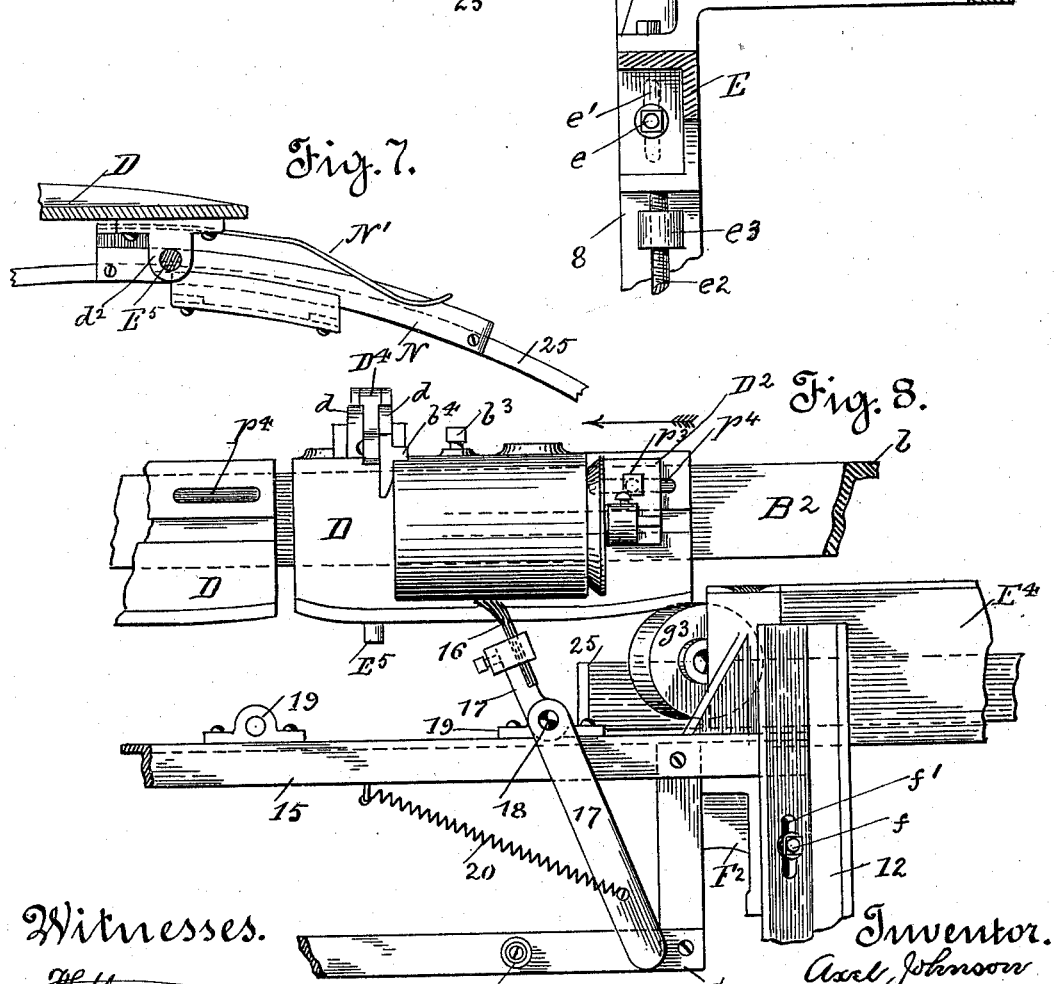

(No Model.)
4 Sheets—Sheet 4.
A. JOHNSON.
SIDE SEAM CAN SOLDERING MACHINE.
No. 598,518.
Patented Feb. 8, 1898.
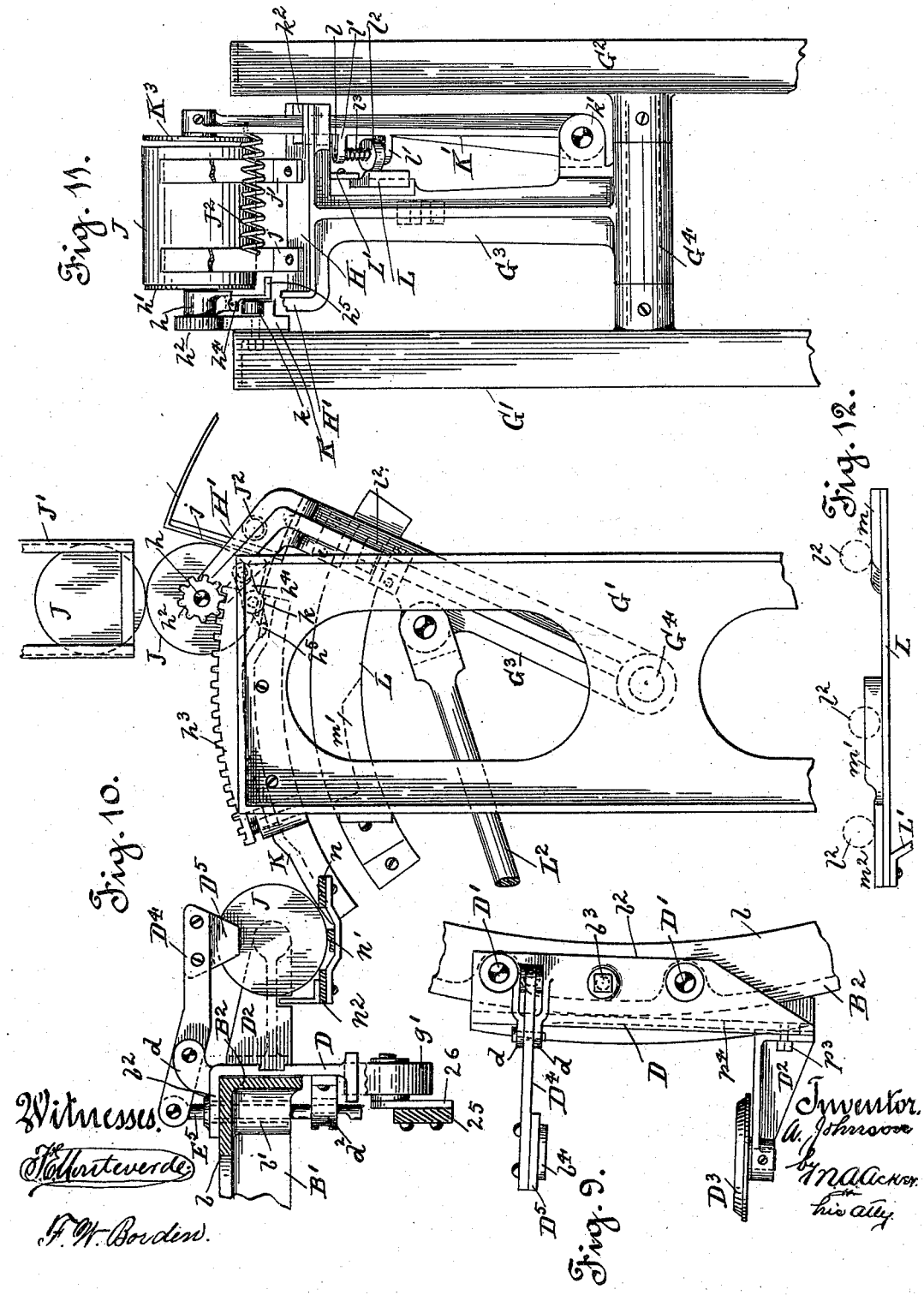

UNITED STATES PATENT OFFICE.

AXEL JOHNSON, OF OAKLAND, CALIFORNIA.

SIDE-SEAM CAN-SOLDERING MACHINE.

SPECIFICATION forming part of Letters Patent No. 598,518, dated February 8, 1898.

Application filed February 11, 1897. Serial No. 622,936. (No model.)

*To all whom it may concern:*

Be it known that I, AXEL JOHNSON, a citizen of the United States, residing at Oakland, in the county of Alameda and State of California, have invented certain new and useful Improvements in Side-Seam Can-Soldering Machines; and I do hereby declare that the following is a full, clear, and exact description thereof.

This invention relates to a certain new and useful side-seam-soldering machine for cans, which consists in the arrangement of parts and details of construction, as will be hereinafter fully set forth in the drawings and described and pointed out in the specification.

In the manufacture of tin cans the body is usually formed and the side seam thereof closed or soldered upon what is known as a "seaming-machine," the side seam being closed or soldered before the ends or heads are applied to the can-body.

The object of the invention is to provide a machine whereby the side seam of the can-body is soldered after the heads or ends are secured thereto by drawing or forcing the can through a bath of molten solder, and a further object is to provide a machine which, while being simple of construction and inexpensive, will be enabled to successfully solder the side seam of a large number of cans per day.

Referring to the drawings forming a part of this application, Figure 1 is a top plan view of the machine. Fig. 2 is a side view in elevation showing the machine partly broken away and partly in section, said view being taken on irregular line $x\ x$, Fig. 1, the can-clamping mechanism and the frame thereof being shown in position. Fig. 3 is an enlarged detail end view in elevation of the flux-bath and the can-clamping mechanism disclosed by Fig. 2, the clamping mechanism being shown closed. Fig. 4 is an enlarged detail end view of the can-clamping mechanism in an open position. Fig. 5 is a similar view taken on line $y\ y$, Fig. 1, the frame-plate for the can-clamping mechanism being illustrated so as to show the position of the lock-rod of the movable clamping-jaw when a soldered can is about to be released from between the clamping mechanism. Fig. 6 is a detail rear or inside view in elevation of a section of the machine. Fig. 7 is a detail broken top plan sectional view taken on line $x\ x$, Fig. 6. Fig. 8 is a broken view in elevation of the machine, viewed from such position as to show the can as being carried from the soldering-bath onto the wipers for removing the surplus solder. Fig. 9 is a detail top plan view of the can-clamping mechanism and frame. Fig. 10 is an enlarged detail sectional view in elevation, taken on line $w\ w$, Fig. 1, and viewed in the direction of the arrow. Fig. 11 is a front view in elevation of the feed mechanism for delivering the cans to the soldering-machine; and Fig. 12 is a detail top plan view of the quadrant, with the cam-plates secured to the face thereof.

In the drawings the letter A is used to indicate any suitable base-plate, within the central bearing $a$ of which is fitted and works the lower end of the vertical central shaft A'. This shaft extends through the guide-sleeve $A^2$, supported a distance above the base-plate by the standards $A^3$, and to the upper end of the said central shaft is keyed or feathered the hub B. This hub is cast with the outwardly-extending arms B', which are united by the circular rim $B^2$, the hub, the arms, and the rim constituting the spider-frame of the machine.

Rotary motion is imparted to the central shaft, carrying the spider-frame, by means of the drive-shaft $B^3$, which works in bearings $a'$, said shaft being driven by a belt traveling over the belt-wheel $B^4$, secured to the outer end of said shaft. The motion of this shaft is transmitted to the central shaft through the medium of the gear C, secured near the inner end thereof, which meshes with the gear C', secured to the outer end of the cross-shaft $C^2$, working in bearing $a^2$, and the worm $C^3$ at the opposite or inner end of the said shaft, which meshes with the worm-gear $C^4$, secured to the lower end portion of the central shaft A'.

The circular rim of the spider-frame is formed with an upper inwardly-projecting flange $b$, and is cast on its rear face with a series of vertical bosses $b'$, about thirty in number, more or less, and said rim supports and carries a number of frame-plates D (about fifteen) for the can-clamping mechanism, one frame-plate for each of the can-clamping mechanisms.

Each frame-plate is cast with an inwardly-projecting flange $b^2$, which fits over or rests upon the inwardly-projecting flange $b$ of the rim $B^2$, and the flange $b^2$ of each frame-plate is formed with two downwardly-depending rods or pins D', which fit and work vertically within two of the bosses of the circular rim of the spider-frame. Being thus secured to the rim of the spider-frame each frame-plate is free to move vertically, as hereinafter described.

In order to provide for irregularities in casting and to arrange that each frame-plate may be adjusted up or down as required, a set-screw $b^3$ extends through the inwardly-projecting flange of each frame-plate, Fig. 6. By raising or lowering said set-screws each frame-plate may be given a vertical adjustment, so as to bring the frame-plate in line with the others. To one end of each frame-plate is bolted or otherwise secured a short outwardly-extending arm or bracket $D^2$, Figs. 3 and 4, which at its outer end carries a clamp plate or disk $D^3$. To the opposite end of each clamp-plate is fulcrumed between the ears $d$, projecting from the top thereof, the arm $D^4$, which carries at its outer end the depending can-body clamp-blade $D^5$. The lower end portion of the clamp-blade when lowered bears against the free end of the can and forcing the same against the disk $D^3$ firmly holds the said can between the clamp plate and disk, the inwardly-projecting rib $b^4$ bearing upon the upper edge of the can, Fig. 3. The open end of the can rests against and is closed by the disk or clamp-plate $D^3$, while the opposite or closed end, as before stated, is engaged by the clamp-blade $D^5$. To the inner end of each fulcrumed arm $D^4$ is connected the upper end of a release-rod $E^5$. This rod extends downward through an opening cut in the flange of the clamp-plate and rim of the spider-frame below the clamp-plate, and has cut in its lower end portion a notch or has its lower end portion cut away, so as to form a shoulder $d'$, Figs. 3 and 4, which, as hereinafter explained, engages with or rests upon, when the said rod is raised, the upper surface of the guide-sleeve $d^2$, through which it extends, which sleeve is secured to and inwardly projects from the frame-plate D.

Below the spider-frame, a slight distance within the rim thereof, is arranged a series of standards 2, 3, 4, 5, 6, and 7, preferably formed of angle-iron, and a short distance beyond these standards is arranged a second series 8, 9, 10, 11, 12, and 13. Between the standards 2 to 8 and 3 to 9 is secured, by means of set-screws $e$, which work through slots $e'$, formed in said standards, the cross-heads E E', which cross-heads support and carry the flux-holding trough or receptacle $E^2$. By loosening the set-screws $e$ the cross-heads may be raised or lowered, so as to permit vertical adjustment to be given to the flux trough or receptacle by means of the adjusting-bolts $e^2$, which work through ears $e^3$, inwardly projecting from the standards, Fig. 3. Within the flux trough or receptacle is mounted a series of rolls $E^3$, which apply the flux contained within the trough to the side seam of the can as the same is carried thereover. As the clamped can is carried beyond the flux-bath it enters or dips into the solder-bath which is contained within the trough or receptacle $E^4$. This trough or receptacle for the molten solder is supported by the cross-heads F, F', and $F^2$, Fig. 1. These heads, similar to the ones E E', are secured between the standards 4 to 10, 5 to 11, and 6 to 12, respectively, by the set-screws $f$, which work through slots $f'$, cut in the standards, and said cross-heads are raised and lowered, so as to permit vertical adjustment to be given the soldering trough or receptacle by means of the adjusting-bolts $f^2$, which work through ears $f^3$, inwardly projecting from the said standards. The cross-head $F^2$ and the cross-head $F^3$, secured between the standards 7 to 13 in the same manner as the before-described cross-heads, support the semicircular bands or tracks 14 and 15, between which are located the wipers for removing the surplus solder from the can as carried beyond the solder-bath. These wipers consist of a piece of asbestos 16 or other suitable material secured to the upper end of arm 17, each arm being affixed to a cross-shaft 18, working in bearing-boxes 19, secured to the bands or tracks 14 and 15, Fig. 1. Each fulcrumed arm 17 is held in a vertical position by the tension of spring 20, which connects the lower end of the said arm with the band or track 15, Fig. 8. As the can is carried over the wipers the arm 17 is thrown over, but the moment the can passes beyond each wiper the arm 17 is returned to its vertical position by the resiliency of the connecting-spring 20. The arm is prevented from being drawn past its vertical position by the spring 20 by reason of the fact that when in this position its lower end engages the stud or projection $g$, secured to the bracket G. In the present machine employment is made of four wipers, although more wipers may be used, which are located a distance apart and extend to the point 21, or one-third of the distance covered by the tracks or bands 14 15. From this point to point 22 is run, below the bands or tracks 14 15, the perforated air-pipe 23, the air escaping from which serves to cool the solder as the can is carried toward the discharge-chute 24.

Below the rim of the spider-frame is located the band-plate 25, which is run from standard 7 to standard 6, being secured to and supported by these standards and the intermediate standards 2, 3, 4, and 5. To this band-plate is secured by bracket-plates 26 the rolls $g' g^2 g^3$, Fig. 1, upon which rolls ride the frame-plates D as carried around by the rotary travel of the spider-frame.

At one side of the discharge-chute in the present case is located the feed device for conveying the cans to the soldering-machine, which consists of the side standards or frame-plates G' and G², between which works the arm G³, movably secured upon the cross rod or shaft G⁴, which unites the frame-plates near the bottom thereof, Fig. 11. The upper end of the arm G³ terminates in an enlarged T-shaped head H, from which upwardly projects the bracket H'. Through the upper end of this bracket extends the short shaft $h$, which at its inner end carries the clamp-head $h'$ and at its outer end the pinion $h^2$. This pinion meshes with the teeth of the rack-quadrant $h^3$, fastened to the upper end of the frame-plate G'. To the bracket H' is fulcrumed the dog $h^4$, the inner end $h^5$ of which dog projects inwardly beyond the clamp-head $h'$. This dog has secured to the outer face thereof the roll $k$, which roll as the arm G³ is thrown backward and forward rides upon the inclined segment-plate K, bolted to the inner face of the frame-plate G' below the rack-quadrant $h^3$. To the lower end portion of the arm G³, between ears $k'$, is fulcrumed the rod K', which rod works within a socket $k^2$, cut in the T-shaped head H, and has secured to its upper end the clamp plate or disk K³. This clamp plate or disk as moved toward or from the clamp-plate $h'$ clamps or releases the can. To the enlarged head of the arm G³ are bolted or otherwise secured the angle plates or straps $j\,j'$, which serve as a seat onto which the cans J fall as delivered from the feed-chute or runway J'. The rod K' is connected to the angle-plate $j$ by means of the spring J². Upon a rod $l$, connecting the ears $l'$, inwardly projecting from the rod K', works a roll $l^2$, which is held pressed downward by the pressure of the spring $l^3$. This roll as the rod K' is moved forward and backward rides upon the inclined cam-plates $m\,m'$, fastened to one face of the segment-plate L, connected to the frame-plate by bracket L'.

Connection is made between the drive-shaft B³ and the arm G³ by means of the connecting crank-rod L², one end of which is connected to said arm and the inner end to the crank-wheel L³, mounted upon the said drive-shaft.

As the can J drops into the seat formed by the angle-plates or straps $j\,j'$ the arm G³ moves forward. During the forward movement of the arm the roll $l^2$ moves off the cam-plate $m$ and is forced inward against the face of the segment-plate L as the rod K' is drawn inward by the tension of the spring J². The inward movement of this rod forces the clamp-plate K³ against the can, so as to hold the same clamped between the plates $h'$ and K³. While the can is being carried forward, the dog $h^4$ is thrown upward by the roll $k$, riding upon the upward-inclined portion of the plate K, until the end $h^5$ thereof bears against the body of the can. The clamped can, as moved forward, is rotated by the pinion $h^2$ moving over the rack-quadrant until the side seam thereof is engaged by the inwardly-projecting end of the dog. The roll $l^2$, during the forward movement of the arm G³, moves upward and rides upon the upper face of the inner portion of the cam-plate $m'$ until the downwardly-inclined portion $m^2$ is reached. As carried onto this portion of the cam-plate, the roll forces the rod K' outward, so as to move the clamp-plate K³ away from the can in order to release the same. By this time the arm G³ will have made its full inward stroke, and the can, as released, will be deposited upon the seat attached to the soldering-machine between the clamp-disk D³ and the clamp-plate D⁵, with its side seam in line with the flux-bath. As deposited, the roll $k$, controlling the dog $h^4$, rides upon the downwardly-inclined portion of the plate K in order to move the dog out of engagement with the side seam of the can. By securing to the angle-plates or straps $j\,j'$ the rearwardly-extending tailpieces M the cans will be held within the feed-chute or runway J', while the feed mechanism is thrown forward by so arranging that the said pieces will move beneath the feed-chute as the arm G³ is thrown forward.

The seat into which the can is deposited by the feed mechanism consists of three plates or straps $n\,n'\,n^2$, attached at one end to the cross-head E and at the opposite end to the discharge-chute 24, Fig. 1. Upon this seat rest the cans until engaged by the moving clamp plate or disk D³, which carries the can toward the flux-bath. As the can is conveyed toward said bath the lower end of the release-rod E⁵ rides upon the upwardly-inclined cam-plate N, secured to the band-plate 25 a short distance to one side of the feed mechanism, and is gradually raised until the shoulder $d'$ thereof is above the guide-sleeve $d^2$. The moment the shoulder $d'$ is carried above the guide $d^2$ the pressure of the spring-plate N', which bears against the said rod, forces the rod E⁵ over, so as to force the shoulder over upon the upper face of the guide-sleeve $d^2$, it being held down upon its seat by the spring $n^3$. During the upward or vertical movement of the release-rod the outer end of the fulcrumed arm D⁴ is thrown downward and the plate D⁵ forced against the free end of the can J in order to hold the same firmly clamped. The frame-plate carrying the clamping mechanism is raised vertically in order that the clamped can may clear the forward end of the flux-trough E² by riding upon the roll $g'$. The moment the frame-plates move off this roll it lowers by its own weight, so as to place the side seam of the can within the flux-bath, through which it is carried. As the can approaches the rear end of the said bath it is raised clear of the end of the flux-trough and forward end of the solder-trough by the frame-plate riding over the roll $g^2$. As carried past this roll the frame-plate lowers, so as to place the fluxed seam of the can in the solder-bath contained in the trough E⁴. The can is raised to clear the rear end of the solder-trough, as carried from within the solder-bath, by the frame-plate moving over the roll $g^3$. Whatever surplus solder may adhere to the can is removed by the can being carried over the wipers 16. While the can moves from the wipers toward the discharge-chute, the solder is cooled by the blast of air flowing from the air-pipe 23. When the can is brought into line with the discharge-chute, the lower end of the rod $E^5$ strikes against the roll or cam $p$, secured to the slide-plate $p'$, attached to the bracket $p^2$, and is forced outward, so as to move the shoulder $d'$ from off the face of the guide-sleeve $d^2$. The rod is then forced downward by the pressure of the spring $n^3$, drawing therewith the inner end of the fulcrumed arm $D^4$, which throws the outer end upward and removes the clamp-plate $D^5$ from contact with this can, so as to release the same and permit it to fall into the discharge-chute 24.

The present machine is designed for use in connection with the soldering of two-and-one-half-pound cans, but it is equally as well adapted for the soldering of cans of larger size. In order to utilize it for the larger cans, it is only necessary to lower the flux and soldering troughs to the proper height and adjust the bracket $D^2$, which is attached to the frame-plate D by the set-screw $p^3$ working through the slot $p^4$ in said frame-plate, so as to secure the proper distance between the clamp-plate $D^5$ and the disk $D^3$. This change and the adjustment of other parts will be readily understood by any one familiar with this class of machinery.

During the rearward or backward stroke of the arm $G^3$ of the feed mechanism the straps M move from beneath the feed-chute J' in order that the can retained thereby may fall into the seat formed by the angle-plates. While the arm is moving backward, it is necessary that the clamping-disk $K^3$ be held away from the disk $h'$, so that the clamping-disks remain open until the disk $K^3$ clears the can deposited in the soldering-machine. In order to accomplish this, the roll $l^2$ of the arm K' rides upon the inner face of the cam-plate $m'$ its entire distance, and not for a portion of its distance upon the top thereof, as upon the forward stroke of the arm $G^3$.

Having thus described my invention, what I claim as new, and desire to secure protection in by Letters Patent, is—

1. In a side-seam-soldering machine for cans, the combination with the rotatable spider-frame, of the vertically-movable frame-plates secured to and carried by said frame, the can-clamp disk and the movable clamping-plate secured to the frame-plates, devices for raising and lowering the movable clamping-plate in order to release or clamp a can, the vertically-adjustable flux and solder holding troughs, devices for raising the frame-plates carrying the clamping mechanism as the can is moved into and out of the flux and solder bath, and of the wipers for removing the surplus solder from the soldered can.

2. In a side-seam-soldering machine, the combination with the rotatable spider-frame, of a series of frame-plates secured to and carried by the said spider-frame, a clamping-disk for engaging one end of the can secured to a bracket projecting from the frame-plates, a clamp-plate for engaging the opposite end, the fulcrumed arm to which the said plate is fastened, a release-rod connected to the inner end of said arm, devices for raising and lowering the release-rod, the flux and solder troughs, the devices for raising the frame-plates carrying the clamping mechanism as the can is moved into and out of the flux and solder baths, the wipers for removing the surplus solder from the can, and of the feed mechanism for supplying cans to the soldering-machine.

3. In a side-seam can-soldering machine, the combination with the rotatable spider-frame, of a series of vertically-movable frame-plates secured to and carried by said frame, a bracket carrying a clamping-disk adjustably secured to the frame-plates, an arm carrying a clamping-plate fulcrumed to the said frame-plate, a release-rod connected to the inner end of the fulcrumed arm, and of devices for raising and lowering the release-rod.

4. In a side-seam can-soldering machine, the combination with the rotatable spider-frame, of a series of vertically-movable frame-plates secured to and carried thereby, a clamping-disk secured to a bracket adjustably connected to the frame-plate, a clamp-plate carried by an arm fulcrumed to the said frame-plate, a release-rod for throwing the fulcrumed arm up and down, devices for raising and lowering the lift-rod, the flux and solder holding troughs, rolls for raising the frame-plates as the clamped can is carried in and out of the flux and solder baths, of a device for giving adjustment to the frame-plates.

5. In a side-seam can-soldering machine, the combination with the can-clamping mechanism, of the reciprocating arm for delivering cans to the machine, a can-seat carried by said arm, a rotary clamping-disk, a pinion for imparting motion to the disk during the movement of the arm, a rack-quadrant with which said pinion meshes, a dog carried by the arm which engages the side seam of the can, a rod fulcrumed to the said arm, the clamping-disk secured to the upper end of said rod, and of devices for throwing the rod in or out at a right angle to the arm so as to close or open the clamp-disks in order to clamp or release a can.

In testimony whereof I affix my signature, in presence of two witnesses, this 5th day of February, 1897.

AXEL JOHNSON.

Witnesses:
N. A. ACKER,
LEE D. CRAIG.